Oct. 13, 1942. H. G. BALTHASAR 2,298,451
TAG DISPENSER
Original Filed Dec. 15, 1937 5 Sheets-Sheet 1
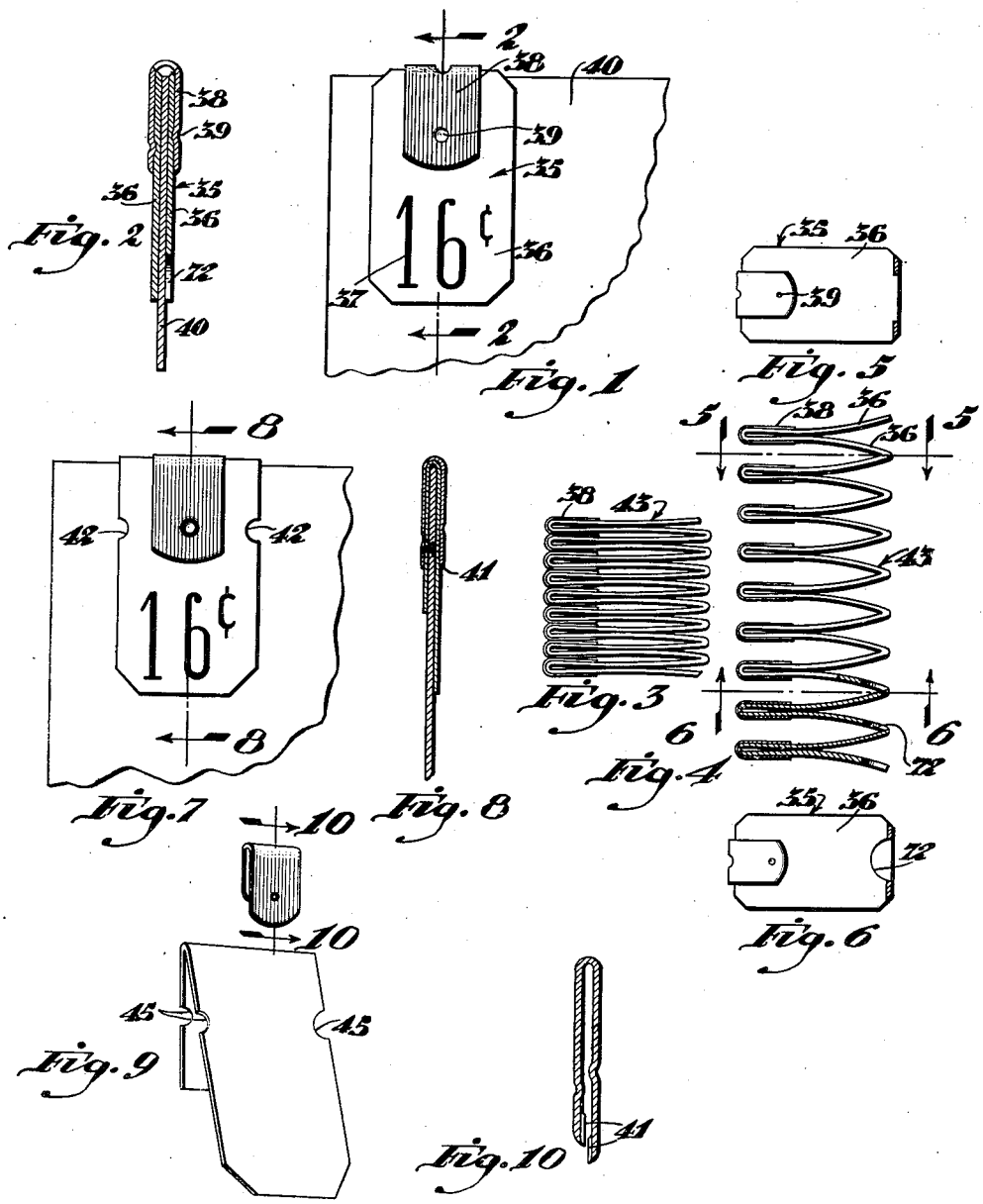

Oct. 13, 1942.     H. G. BALTHASAR     2,298,451
TAG DISPENSER
Original Filed Dec. 15, 1937     5 Sheets-Sheet 2

INVENTOR.
BY Harry G. Balthasar
Wood & Wood
ATTORNEYS

Oct. 13, 1942.  H. G. BALTHASAR  2,298,451

TAG DISPENSER

Original Filed Dec. 15, 1937   5 Sheets-Sheet 3

INVENTOR.
Harry G. Balthasar
by Wood & Wood
ATTORNEYS

Oct. 13, 1942.  H. G. BALTHASAR  2,298,451
TAG DISPENSER
Original Filed Dec. 15, 1937   5 Sheets-Sheet 4
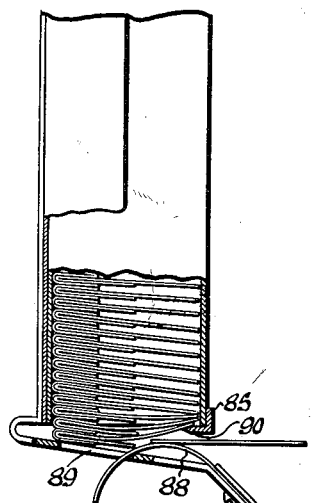
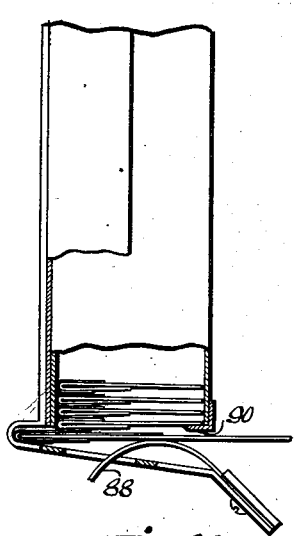
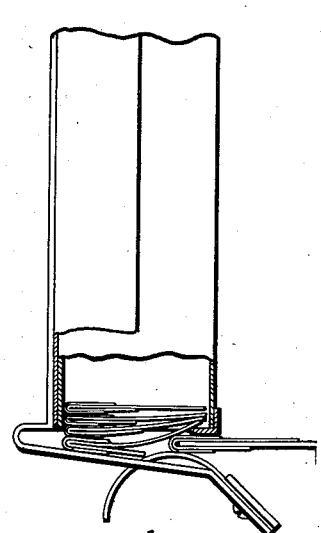
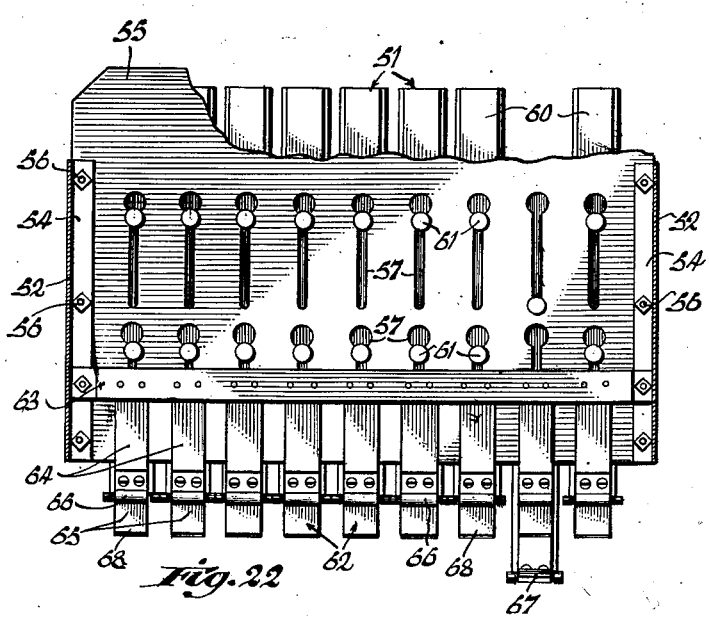
INVENTOR.
BY Harry G. Balthasar
Word & Word
ATTORNEYS Oct. 13, 1942.  H. G. BALTHASAR  2,298,451
TAG DISPENSER
Original Filed Dec. 15, 1937   5 Sheets-Sheet 5
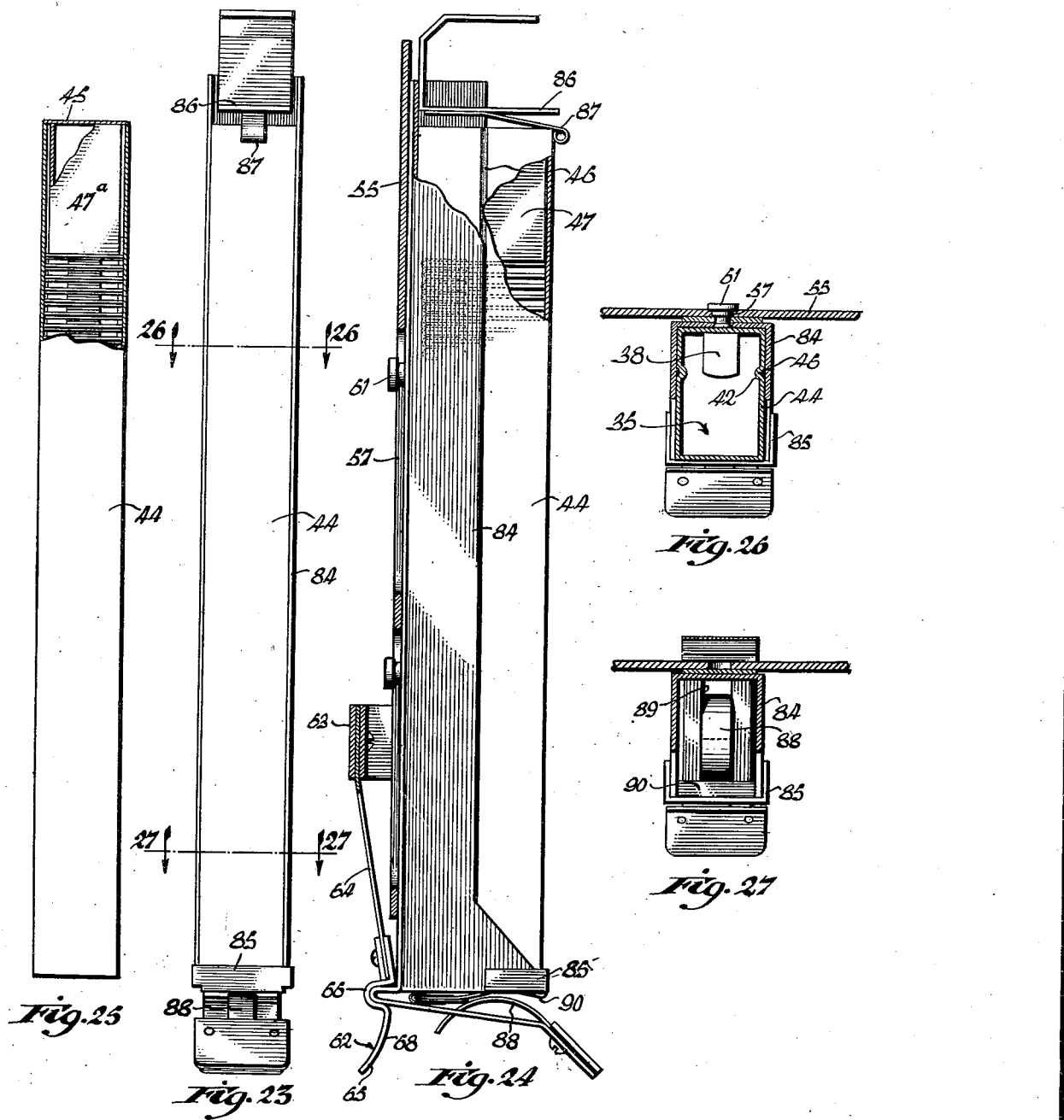
INVENTOR.
Harry G. Balthasar
BY
Wood & Wood
ATTORNEYS Patented Oct. 13, 1942

2,298,451

UNITED STATES PATENT OFFICE 2,298,451

TAG DISPENSER

Harry G. Balthasar, West Tower Park, Ohio, assignor to The Sprayomatic Products Company, Cincinnati, Ohio, a corporation of Ohio Original application December 15, 1937, Serial No. 179,974. Divided and this application February 2, 1940, Serial No. 317,040

7 Claims. (Cl. 93—88)

This invention relates to price marking tags or tickets and more particularly to means for applying the same to merchandise.

The structure of a price tag for use on a greeting card and the attachment of the price tag to the card involve problems entirely different from those attendant the construction of a price tag for use on other types of merchandise, such as garments and the attachment of the price tag thereto. The fine paper and artistic designs embodied in greeting cards would be damaged if the card were at all marked. This type of merchandise must be absolutely perfect in order to be saleable. It has been found in the past that the application of price tags to greeting cards, through the use of the customary clips, indented or otherwise marked the edge of the card.

In the application of which this application is a division, it has been the object of the present inventor to provide a price marking tag or ticket adapted to be applied to flat merchandise, such as greeting cards or the like. This tag can be readily applied to the edge of the merchandise without marking the card in any way, and, at the same time, it employs a metal clip structure which provides the holding action requisite for maintaining the price ticket in place without contact of the metal with the card.

Also in the first application, it has been a further object of the present inventor to provide these tickets stacked either loosely in cartons, which may be readily inserted in a dispensing machine for dispensing the tickets directly from the cartons, or in continuous strip form which may be readily inserted in the magazine of a dispenser for delivery to an attachment point and with respect to a cutoff knife active for severing each ticket as it is applied.

The concept resulting from these objectives, generally speaking, has taken physical form in a folded paper structure adapted to engage over the edge of the greeting card and including as a fixed part of the ticket, a metal clip, which imparts a holding force to the ticket sufficient for holding it in place upon the greeting card without contact of the metal with the card. The tickets, in gang strip length, are folded somewhat after the manner of the pleats of an accordion.

It has been the object of the inventor in the present application to provide a dispensing machine adapted to contain the improved tickets in a series of magazines, one for each price or size. These magazines are independent units readily detachable from the machine and the present invention resides in the units separately as well as a part of the machine.

It has been a further object to provide that each of the units includes suitable mechanism for receiving the greeting card and, upon insertion of the greeting card, attaching the price ticket thereto, and, in the case of the continuous strip, severing the tag from the strip in the motion of attachment.

Further objects have resulted in the provision of a structure facilitating the attachment of the magazines to the machine, and the movement of each magazine to a dispensing position clear of the remainder of the magazines, for attachment of the tickets to any position on the greeting cards.

Other objects and advantages will be more fully apparent from the drawing in which:

Figure 1 is a front view of the price marking ticket of this invention, showing it applied to a greeting card.

Figure 2 is a sectional view taken on line 2—2, Figure 1.

Figure 3 is a side view of a portion of a strip of tickets.

Figure 4 is a view taken similar to Figure 3, but showing the accordion pleated strip of tickets drawn out and for illustrative purposes, a portion in section.

Figure 5 is a sectional view taken on line 5—5 of Figure 4.

Figure 6 is a sectional view taken on line 6—6 of Figure 4.

Figure 7 is a front view of a modified form of ticket.

Figure 8 is a sectional view taken on line 8—8 of Figure 7.

Figure 9 is a perspective view of the ticket and the metal clip showing them separated.

Figure 10 is a sectional view taken on line 10—10 of the clip of Figure 9.

Figure 22 is a sectional view taken on line 22—22, Figure 21.

Figure 23 is a front view of a modified form of dispensing unit.

Figure 24 is a side view of the unit of Figure 23, showing it mounted on a support plate of the dispensing device.

Figure 25 is a front view, partially in section, of the carton or dispensing magazine for the strip of tickets.

Figure 26 is a sectional view taken on line 26—26 of Figure 23.

Figure 27 is a sectional view taken on line 27—27 of Figure 23 having the carton removed therefrom.

Figure 28 is a fragmentary side view, partially in section, of the lower end of the modified form of dispensing unit, showing the greeting card about to be inserted.

Figure 29 is a view similar to Figure 28, but showing the ticket attached to the greeting card.

Figure 30 is a view similar to Figure 28, but showing the greeting card being withdrawn from the magazine with the ticket attached.

Figure 11:
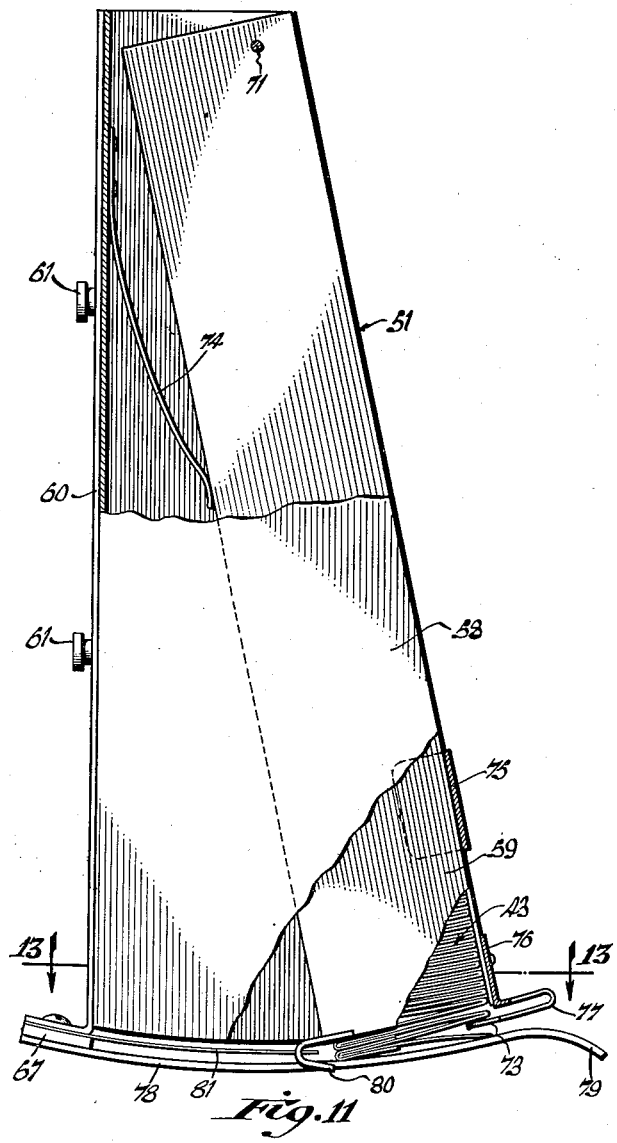
Figure 11 is a side view, partly broken away, of a dispensing unit for attaching and separating the tickets of a strip.
Figure 12:
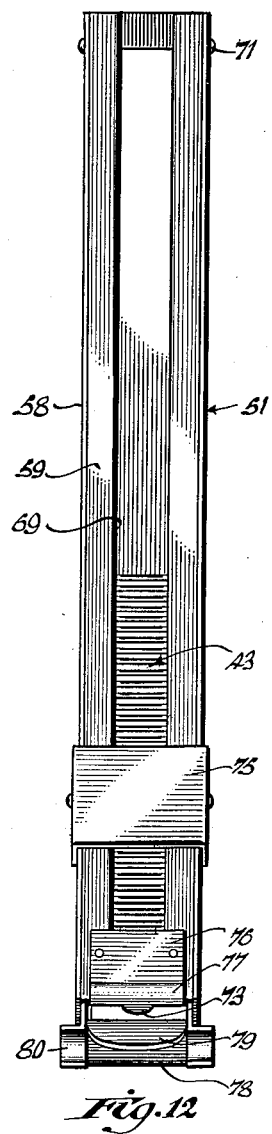
Figure 12 is a front view of Figure 11.
Figure 13:
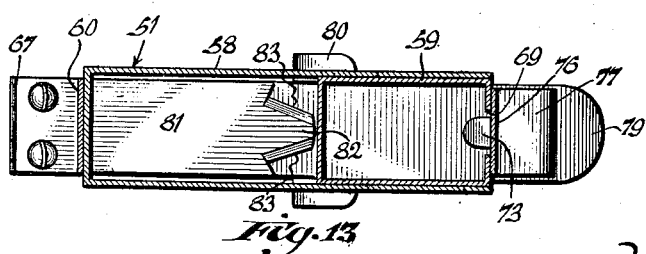
Figure 13 is a sectional view taken on line 13—13, Figure 11.

Referring to the drawing, the improved price marking tags or tickets are illustrated in Figures 1 to 10, inclusive. The individual tickets, one of which is shown at 35, consist, in each instance, of an overlapped or folded piece of heavy paper or cardboard, providing flaps 36—36. One or both flaps may contain the price information shown at 37.

The metal clip, indicated at 38, consists of a strip of metal folded upon itself and engaged over the folded edge of the ticket. This clip is intended centrally, as at 39, to provide frictional engagement with the body of the ticket (see Figure 2). Accordingly, when the greeting card, indicated at 40, is inserted between the flaps of the ticket, the gripping or spring action of the clip on the ticket fixes the ticket to the greeting card.

The clip may include slightly inturned inner edges 41 (see Figure 10) adapted to be imbedded in the ticket, to provide greater friction for holding the clip in position. As will be more fully apparent hereinafter, the tickets may contain notches as at 42, for guidance in the dispensing magazines. These notches are adapted to register with longitudinal guide members that are disposed within the magazines.

As shown in Figures 3 to 6, inclusive, the tickets may be provided in continuous strip form. That is to say, instead of being cut up into individual tickets, an accordion-pleated strip 43, with the metal clips engaged over the folded edges along one side of the strip, is provided.

The individual tickets are severed from the gang strips by means of knives at the base of the magazines, which act between the flaps of adjacent tags and sever the line of fold between the adjacent flaps.

As shown in Figures 23 to 25, the separated tickets may be furnished in elongated cartons, indicated at 44. These cartons are formed of cardboard to provide four long sides, which provide a cross-section slightly larger than the plan view dimensions of the ticket. The usual tucking flaps 45 are provided at each end of the carton. The sides of the cartons are indented longitudinally to provide the guides 46, cooperating with the notches 42 in the tickets, as shown in Figure 26. Before this carton is inserted into the magazine, the upper and lower end flaps are removed, and a suitable weight 47 is placed within the magazine upon the top of the strip of tickets. The tags are packed in the carton at the top of which is a cardboard spacer 47a that provides space for the weight and is removed prior to the insertion of the weight.

In the preferred embodiment of the dispensing machine (see Figures 11 to 22) the following structure is embodied:

A base 48 is provided. A cabinet 49 rests upon the base providing a series of compartments 50 opening to the rear. There is one compartment for each dispensing unit 51, adapted to contain the ticket supplies for that particular dispensing unit. The dispensing unit 51 is mounted upon the front of the cabinet by means of side brackets 52, consisting of plates attached to the cabinet by screws 53 and providing forward flanges 54 turned inwardly toward each other. The supporting plate 55 for the dispensing units is attached to these flanges by means of bolts 56.

The plate is provided with parallel sets of vertically disposed, aligned bayonet slots 57 for attaching the dispensing units. Inasmuch as the individual dispensing units are duplicates, a description of one, and its attachment, will suffice. Each dispensing unit comprises a fan-shaped holder or guide 58 for a pivotally mounted magazine 59. The holder is formed of metal plate, U-shaped in cross-section and flaring toward the bottom, and appears more or less fan-shaped in side view and U-shaped in top view. A reinforcing and attaching strip 60 is attached along the back wall of this holder or guide 58 and includes headed attaching pins 61. The heads of these pins may traverse the large portions of the bayonet slots and, upon downward movement of the holder, will engage the rear surface of the plate marginally of the bayonet slots (see Figure 22), thus securing the holders against outward displacement.

The holders 58 are sustained in normal position of non-use by means of clips 62, fixed to, and depending from, a cross-bar 63, attached between the ends of the support plate and spaced therefrom. These clips consist of spring arms 64 and clip elements 65, attached to the lower ends of the spring arms. Each clip element provides a cross-indentation 66 which engages over a projection 67 at the back lower edge of the holder. The ends 68 of the clips below the indentations are inclined rearwardly so as to provide a camming portion, which, upon engagement by the projection of the holder, forces the clip rearwardly so that the projection will snap into the indentation.

The magazine is generally rectangular in cross-section, and thus provides a chamber through which the tickets readily slide. The front wall of the chamber is slotted longitudinally as at 69 so that the contents are visible, enabling the operator to determine the supply of tickets in the magazine. The magazines are relatively long, so as to contain a great many tickets. The magazine being pivoted on a pin 71 at its upper forward corner within the holder, has a swinging movement.

The tickets open forwardly. The lowermost flaps of the respective tickets include a semi-circular notch 72 adapted to clear a retainer lip 73 engaging the inner side of the upper flap for sustaining it and permitting the entry of the greeting card between the respective flaps. A flat spring 74, provided between the back wall of the holder and the back wall of the magazine, urges the magazine constantly forward into engagement with a stop 75 disposed across the face or open end of the holder. The retainer lip 73 is formed of a strip of metal having one flange 76 fixed to the forward wall of the magazine, at the lower end thereof, and another flange 77 folded upon itself to provide an inwardly projected semi-circular lip, in registry with the semi-circular notches 72 in the tickets.

A guide and support, for price-marking the merchandise, is formed by the provision of a guide strip 78 attached at the rear end to the projection 67, previously mentioned. This element is arcuate, following the arcuate contour of the bottom of the holder, but spaced therefrom to provide a throat into which the card is inserted.

The forward end 79 of the guide strip is turned downwardly at an angle, to provide a flared opening. Abutment fingers 80 project from the sides of the magazine through the clearance afforded by the throat portion and are in the form of forwardly opening hooks, which bear against the card after it has been engaged upon the ticket.

The card is the medium for swinging the magazine backwardly and causing the knife blade 81, projecting forwardly from the projection 67, to enter between the adjacent folds of adjacent tickets to sever the connection between the tickets. The forward end of the knife is of spear shape so that it may enter into the semi-circular opening and may slice the bend portions of the tag at each side thereof.

Specifically described, the knife includes a spear like projection 82, including sloping side edges 83, which have a shearing action on the bent portions of the tag, which are located at each side of the circular notch.

Figure 14:
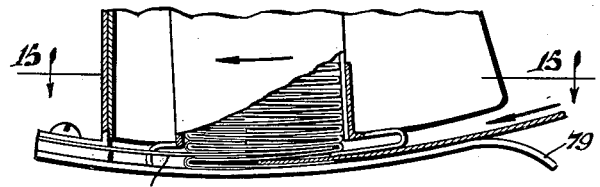
Figure 14 is a fragmentary sectional view of a portion of Figure 11, illustrating the ticket magazine moving back during the operation of inserting the greeting card into the ticket.
Figure 15:
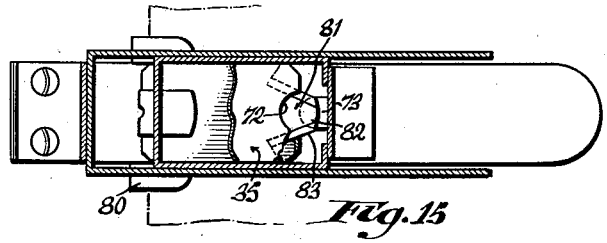
Figure 15 is a sectional view taken on line 15—15 of Figure 14.
Figure 16:
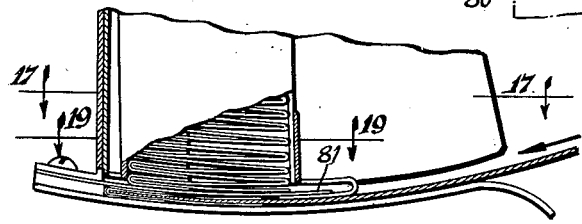
Figure 16 is a view similar to Figure 14, illustrating the magazine at the inner limit of its stroke with the ticket completely attached to the greeting card and severed from the strip.
Figure 18:
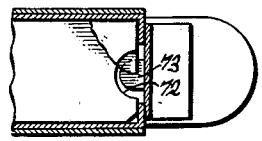
Figure 18 is a fragmentary sectional view similar to Figure 17 illustrating the magazine returned to normal position with the next succeeding ticket in position for attachment to a card.
Figure 19:
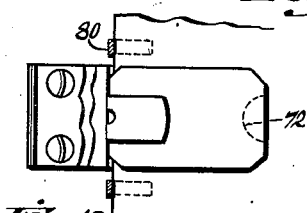
Figure 19 is a sectional view taken on line 19—19 of Figure 16.
Figure 17:
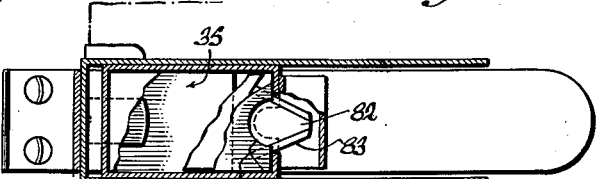
Figure 17 is a view taken on line 17—17, Figure 16.
Figure 20:
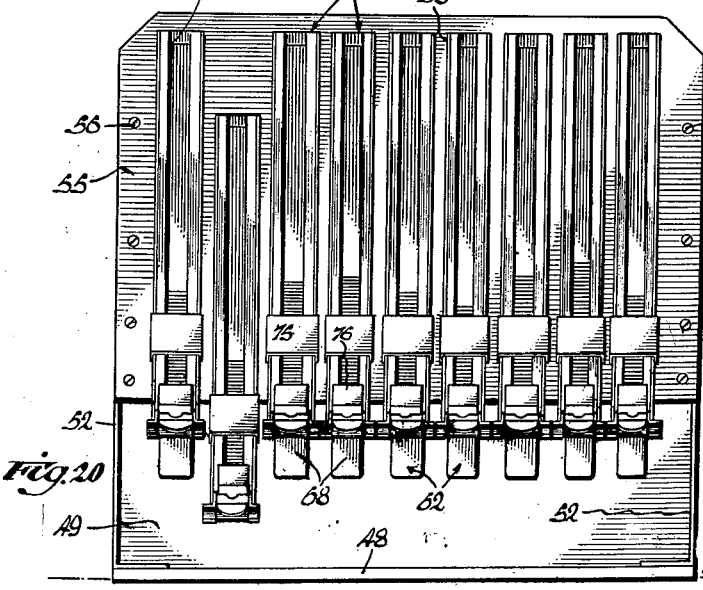
Figure 20 is a front view of a dispensing machine illustrating a plurality of the dispensing units thereon.
Figure 21:
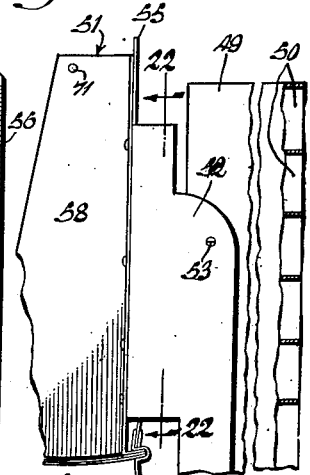
Figure 21 is a fragmentary side view of Figure 20.

As the card is moved inwardly it will be engaged between the folds of the ticket. The force required to move the card into full engagement with the ticket is greater than the spring resistance of the magazine. Consequently the magazine swings rearwardly when the card is only partially engaged as shown in Figure 14. This rearward movement occurs when engagement occurs with the bend in the ticket. The magazine moves rearwardly, and the knife, sliding between the adjacent tickets, severs the same just before the magazine reaches its rear portion as shown in Figure 16. The spring 74 would swing the magazine forwardly upon the severing of the ticket but this is prevented by engagement of the abutment members 80 against the card. The operator is then aware that the full operation of attaching and severing has been completed, and he withdraws the card, the ticket coming out with it, and the magazine returning to normal position.

In the modified type of device shown in Figures 23 to 27, inclusive, the magazine does not have a swinging movement. The magazine is constituted by the elongated ticket carton 44, itself. This package is held within a U-shaped holder 84. The holder includes, at its lower end, a crosspiece 85 for confining the carton in position, and it incorporates a top flange 86 carrying a spring clip 87, which may be raised to permit insertion of the carton, and which snaps into position against the front face thereof. As stated previously, the flaps are torn off the ends of the carton and a weight is inserted upon the tickets, tending to force them out of the bottom of the carton. The tickets are retained to position by means of a retainer finger 88, formed of spring steel, having its forward end attached in the lip portion of the bottom of the magazine at the entrance to the throat thereof, and a body portion, extending above the bottom flange and having its inner end operating in a clearance slot 89 in the bottom. Just inside the throat, and as a part of the cross-piece of the magazine, an upwardly turned deflector lip 90 is provided for deflecting the upper flap of the lowermost tag downwardly after the card has been inserted and the ticket is in position upon the card, and during withdrawal thereof.

Having described my invention, I claim:

1. A dispenser for price marking tickets adapted to be severed from an accordion pleated piece of material and providing flaps adapted to be engaged over the edge of flat merchandise, comprising a magazine supporting the stack of tickets constituted by said strip, a support at the lower end of the magazine for retaining the stack within the magazine and the lowermost ticket in position for attachment, said magazine and support providing a throat into which flat merchandise is inserted, a cutting blade supported adjacent the magazine, and a pivotal mounting for the magazine, said cutting blade adapted to sever the lowermost ticket as adjacent tickets engage above and below the blade.

2. A dispenser for price marking tickets consisting of overlapped strips of material, said dispenser comprising a magazine supporting a stack of said tickets, a support at the lower end of the magazine for retaining the stack within the magazine and the lowermost ticket in position for attachment, said magazine and support providing a throat into which the flat merchandise is inserted, and means on the magazine for holding the lowermost ticket with the flaps constantly spread for insertion of said merchandise.

3. A dispenser for price marking tags of the type providing folds into which flat merchandise is inserted for attachment of the tags to the merchandise, comprising a carton containing a stack of tags, a holder for said carton, a support at the base of the holder, and means on the holder for sustaining the lowermost ticket with the folds constantly spread for insertion of the merchandise into the tag and attachment of the tag to the merchandise.

4. A dispensing device for successively feeding and applying one of a plurality of lapped double folded tags having one flap longer than the other and adapted to be clasped on the margin of the goods to be tagged, comprising a tubular magazine for sustaining said tags in stacked relationship, a retaining lip at the lower open end of said tube to engage the longer flap of the lowermost tag, a tag supporting plate spaced downwardly from said retaining lip for sustaining the rear edge of said tag whereby the open end of the lowermost tag is sprung in the form of a V opening to facilitate insertion of the goods to be tagged.

5. A dispenser for successively feeding and applying one of a plurality of double folded tags adapted to be clasped on the margin of the goods to be tagged, each of said tags being severed from a continuous zig-zag folded strip of joined tags, comprising a tag strip magazine and a tag severing member, said magazine movable relative to said tag severing member, whereby upon insertion of the goods to be tagged, the magazine is moved relative to said severing member to sever the tag from the strip.

6. A dispenser for successively feeding and applying one of a plurality of double folded tags adapted to be clasped over the margin of the goods to be tagged, comprising a magazine for sustaining a plurality of tags in stacked relationship and having their open edges facing outwardly, said magazine having an opening at the base thereof for the insertion of the goods to be tagged, and a stationary lip engaging the upper flap of the lowermost ticket whereby the lowermost tag of the stack is sustained in said opening in open condition to facilitate insertion of the goods to be tagged.

7. A dispenser for successively feeding and applying one of a plurality of double folded tags adapted to be clasped on the margin of the goods to be tagged, each of said tags adapted to be severed from a continuous zig-zag folded strip of joined tags, each alternate fold provided with a clearance notch along its joined edge, comprising a tag strip magazine, a tag severing member, said magazine movable relative to said severing member, a tag supporting member in spaced relationship with said severing member to permit insertion of the goods to be tagged, a tag supporting finger secured on said magazine and projecting inwardly thereof, whereby the notch of the lowermost tag permits the lower fold of said tag to drop and the upper fold to be sustained on said finger to facilitate the insertion of the goods to be tagged.

HARRY G. BALTHASAR.